United States Patent [19]

Muraoka et al.

[11] Patent Number: 5,907,009
[45] Date of Patent: May 25, 1999

[54] SURFACE-TREATING AGENT FOR CARBON BLACK

[75] Inventors: Kiyoshige Muraoka, Kobe; Yasuhisa Minagawa, Akashi, both of Japan

[73] Assignee: Sumitomo Rubber Industries, Ltd., Hyogo-ken, Japan

[21] Appl. No.: 08/890,757

[22] Filed: Jul. 11, 1997

[30] Foreign Application Priority Data

Jul. 12, 1996 [JP] Japan .................................. 8-183133

[51] Int. Cl.$^6$ ..................................................... C08K 3/00
[52] U.S. Cl. ..................... 524/495; 252/511; 423/440.2; 523/215; 524/496
[58] Field of Search ......................... 423/440.2; 252/511; 524/495, 496; 523/215

[56] References Cited

U.S. PATENT DOCUMENTS

| | | | |
|---|---|---|---|
| 4,680,076 | 7/1987 | Bard | 156/306.9 |
| 4,803,232 | 2/1989 | Shah | 523/456 |
| 4,822,844 | 4/1989 | Kawakami et al. | 524/496 |
| 4,824,900 | 4/1989 | Sakurai | 524/495 |

FOREIGN PATENT DOCUMENTS

| | | |
|---|---|---|
| 0588287 | 9/1993 | European Pat. Off. . |
| 2136438 | 9/1984 | United Kingdom . |

*Primary Examiner*—Edward J. Cain

[57] ABSTRACT

A surface-treating agent for carbon black comprising an amino-containing low molecular weight diene polymer which comprises a trunk chain of a low molecular weight diene polymer having a molecular weight of 1,000 to 100,000 and having side chains containing amino groups in an amount of 0.25 to 20 mole % per the diene unit of the trunk chain with the exception as to the ends of the trunk chain. The carbon black surface-treated with the surface-treating agent of the present invention is blended with a matrix polymer such as a diene rubber. The obtained rubber composition is superior in processability, mechanical properties and low fuel consumption and is useful, for example, for use with tires.

8 Claims, No Drawings

SURFACE-TREATING AGENT FOR CARBON BLACK

TECHNICAL FIELD

The present invention relates to a surface-treating agent for carbon black.

BACKGROUND OF THE INVENTION

Hitherto, carbon black is employed widely as a filler for reinforcing plastics or rubbers.

In recent years, high properties such as high abrasion resistance are required for rubbers, and thus carbon black having a large specific surface area and high reinforcing ability has been blended with rubbers.

However carbon black having a large specific surface area are difficult to bond with a rubber component in rubber compositions, and thus the carbon black particles tend to aggregate with each other. As a result, it is not easy to uniformly disperse carbon black into the rubber component and under ordinary processing conditions, the desired reinforcing effect cannot be obtained. Also, if it is tried to disperse carbon black uniformly in rubber, a large amount of energy for kneading is required, which lowers productivity.

Particularly in the field of tires, low fuel consumption (low loss tangent) is required. If carbon black having a large specific surface area is blended with rubber to improve the mechanical strength of tires, the loss tangent (tan δ) of the tire becomes large and fuel consumption is increased.

For improving dispersibility of the carbon black having a large specific surface area into a rubber component, a method for modifying the surface of the carbon black particles has been proposed and has been partially practiced.

For example, in JP-B-5643/1970, JP-B-24462/1983, JP-B-30417/1968 and U.S. Pat. No. 3,282,719, there is proposed that the aggregation force between the carbon black particles is reduced by the addition of oily materials or high molecular materials. According to the proposal, however, there is less effect in the case where the carbon black having a large specific surface area are used, and an improvement in the mechanical properties and low fuel consumption of the tire cannot be satisfied at the same time.

Also, in JP-A-250042/1987, JP-A-250073/1987, JP-A-152165/1989 and JP-A-284564/1989, for example, there is proposed that in view of polar groups such as hydroxyl group, carboxyl group and carbonyl group on the surface of carbon black particles having a large specific surface area, dispersibility into a matrix polymer is improved by surface-treating with a compound having an affinity for these polar groups.

According to the descriptions of JP-A-250042/1989 and JP-A-250073/1989, the surface of the carbon black particles is treated with an amine compound which is an antioxidant for rubber, and dispersibility of the carbon black is improved, and the mechanical properties of the obtained rubber is also improved to some extent. The affinity to the matrix polymer is, however, insufficient and, further, low fuel consumption required in the tire field is also insufficent.

According to the descriptions of JP-A-152165/1989 and JP-A-284564/1989, the carbon black particles are surface-treated with a saturated high molecular weight compound containing a functional group which has an affinity to the polar groups on the surface of carbon black, and it has been tried to improve the affinity to the matrix polymer through the saturated high molecular chain portion. However, these technologies utilize the chemical affinity of the saturated high molecular weight portion to the matrix polymer and there is no chemical bonding with the matrix polymer such as rubber. Therefore, the bonding strength with the matrix polymer sometimes becomes insufficent and, particularly in the field of tires, it is difficult to improve low fuel consumption (to decrease loss tangent).

Further, there is proposed to bond chemically a high molecular weight compound with the matrix polymer such as rubber in JP-A-100730/1994. However, the compound has a functional group only at one end of the molecular chain, and thus an improved effect cannot be obtained.

As a result of the inventors' investigation of the above-mentioned prior art and their intensive study, it has been found that the following properties are necessary for a surface-treating agent for carbon black, which is superior in reinforcing ability, dispersibility and processability and has strong bonding strength to the matrix polymer such as rubber.

(1) Having a functional group which interacts with the acidic functional group on the surface of the carbon black particles and can bond with the carbon black particles.
(2) Increasing the number of the functional groups in order to obtain a strong interaction with carbon black.
(3) Having a reactive portion which produces a strong bonding with the matrix polymer such as a diene rubber.
(4) The reactive portion of (3) is not reactive during the process such as the kneading step, from the viewpoint of processability.
(5) The entire molecular weight being relatively low from the viewpoint of reactivity with carbon black.

Further, the present inventors have discovered an amino-containing low molecular weight diene polymer as a surface-treating agent and have completed the present invention by utilizing this polymer.

SUMMARY OF THE INVENTION

The present invention relates to a surface-treating agent for carbon black comprising an amino-containing low molecular weight diene polymer which comprises a trunk chain of a low molecular weight diene polymer having a molecular weight of 1,000 to 100,000 and having side chains containing amino groups in an amount of 0.25 to 20 mole % per diene unit of the trunk chain but not at the ends of the trunk chain (hereinafter, said amino-containing low molecular weight diene polymer may be referred to as "low molecular weight diene polymer").

Also, the present invention relates to carbon black bonded with the low molecular weight diene polymer through hydrogen bonding (hereinafter, said carbon black may be referred to as "surface-treated carbon black").

Also, the present invention relates to a rubber composition comprising a rubber component containing a diene rubber and the surface-treat ed carbon black.

Further, the present invention relates to a rubber composition obtained by blending the surface-treating agent, a rubber component containing a diene rubber and carbon black.

DETAILED DESCRIPTION

In the surface-treating agent for carbon black according to the present invention, the amino group portion of the amino-containing low, molecular weight diene polymer is bonding through hydrogen bonding with the carbon black having on its surface functional groups such as hydroxyl group, carboxyl groups, carbonyl groups and/or quinone groups.

Namely, in the present invention, the surface-treatment of carbon black means to bond the low molecular weight diene polymer of the surface-treating agent with the carbon black through hydrogen bonding.

As a result, the aggregation force of the particles of the surface-treated carbon black according to the present invention becomes weaker than that of the carbon black before the surface treatment. The surface-treated carbon black shows good dispersibility in the matrix polymer which has an affinity to the low molecular weight diene polymer bonded on the surface of carbon black particles through hydrogen bonding.

Also, the low molecular weight diene polymer bonded with the carbon black can be bonded with the matrix polymer at its carbon-carbon double bond portion. Namely, the carbon black can be bonded with the matrix polymer via the low molecular weight diene polymer.

The matrix polymer may be a polymer which can be bonded with the carbon-carbon double bond portion of the low molecular weight diene polymer. As the matrix polymer, there are, for example, styrene-butadiene block copolymer, 1,2-polybutadiene, trans-polyisoprene, various diene rubbers, butyl rubber, halogenated butyl rubber and EPDM, as well as various kinds of thermoplastic resins and thermosetting resins containing a vulcanizable group. Among them, the diene rubbers having a carbon-carbon double bond, which is used particularly in the field of tires, are suitable from the view point that the diene rubbers have an affinity for the low molecular weight diene polymer chain of the surface-treating agent and that both can be bonded chemically with each other at their carbon-carbon double bond portions. As the diene rubbers, there are, for example, natural rubber (NR), butadiene rubber (BR), isoprene rubber (IR), styrene-butadiene rubber (SBR), acrylonitrile-butadiene rubber (NBR). The diene rubbers may be used alone, or in optional admixture of two or more.

It is effective to use the carbon black surface-treated with the surface-treating agent of the present invention in the field of tire. Hitherto, if the conventional carbon black is added particularly to a rubber composition for tire which comprises a diene rubber as rubber component, as mentioned above, an improvement in the mechanical properties of the tire is recognized but fuel consumption is increased. To the contrary, if the carbon black surface-treated with the surface-treating agent of the present invention is employed, a tire superior in both mechanical properties and low fuel consumption can be obtained, although the reason thereof is not clear.

The reason why the low molecular weight diene polymer having a carbon-carbon double bond is selectively employed as the constituent of the surface-treating agent for carbon black according to the present invention is that the low molecular weight diene polymer is less reactive during such process steps as kneading with the matrix polymer and thus good processability can be ensured. As the means to bond chemically the matrix polymer with the low molecular weight diene polymer, there are employed, for example, a method of vulcanization by using sulfur or a phenolic resin type vulcanizing agent in case where the matrix polymer is a thermoplastic resin, a method of vulcanization by using sulfur in the case where the matrix polymer is diene rubber, or the like. Particularly in the field of tires wherein the matrix polymer is a diene rubber, and wherein crosslinking between the unsaturated groups both in the surface-treating agent of the present invention and in the diene rubber is produced at the time when the diene rubber is vulcanized with sulfur, strong bonding can be obtained without adding any particular reaction step.

The low molecular weight diene polymer of the amino-containing low molecular weight diene polymer which constitutes the surface-treating agent for the carbon black of the present invention is a polymer which has a low molecular weight and is prepared from a diene monomer, for example, a conjugated diene such as butadiene, isoprene or 1,3-pentadiene alone or in optional admixture of two or more. Said polymer may contain a copolymer component such as styrene or acrylonitrile. As the low molecular weight diene polymer, there are, for example, liquid polyisoprene, liquid isoprene-styrene copolymer, liquid polybutadiene, liquid isoprene-butadiene copolymer, liquid styrene-butadiene copolymer, liquid acrylonitrile-butadiene copolymer, and the like. Among them, liquid polyisoprene and liquid polybutadiene are preferable from the viewpoint of good affinity to the diene rubber and, further, liquid polyisoprene is further preferable from the viewpoint that excellent strength is obtained.

The molecular weight of the low molecular weight diene polymer is 1,000 to 100,000, because when the molecular weight is too low, improvement of the mechanical properties and low fuel consumption of the obtained tire cannot be satisfied at the same time, and when the molecular weight is too high, the viscosity becomes high, which causes the reaction with carbon black to become difficult, and also the workability for the surface-treatment of the carbon black is lowered. The molecular weight is preferably 3,000 to 80,000 from the viewpoint of suitable viscosity and good handling workability. The molecular weight is further preferably 5,000 to 50,000 from the viewpoint of excellent mechanical properties and low fuel consumption of tire.

In the present invention, by introducing an amino group into the low molecular weight diene polymer, the introduced amino group is bonded through hydrogen bonding with the acidic functional group such as the hydroxyl group, the carboxyl group, the carbonyl group and/or the quinone group on the carbon black surface.

The amino-containing low molecular weight diene polymer of the present invention contains the amino group in an amount of 0.25 to 20 mole % per the diene unit in the trunk chain. Because the larger number of the functional groups is preferable for the hydrogen bond with the carbon black, the chemical bonding between the low molecular weight diene polymer and the matrix polymer such as diene rubber is not prevented (for example, the vulcanization property is not decreased), and the processability during the kneading with the matrix polymer is not lowered. The content of amino group of the low molecular weight diene polymer is preferably 0.5 to 15 mole % from the viewpoint that a decrease in processability caused by an increase in the viscosity is prevented, more preferably 1 to 10% by mole can be used from the viewpoint where the scorch time becomes long to some extent.

With respect to the structure of the amino-containing low molecular weight diene polymer, it is assumed, for example, the case wherein a hydrogen atom on a carbon atom which constitutes the trunk chain and/or side chain of the low molecular weight diene polymer is directly substituted by an amino group, the case wherein an amino group is bonded through an alkylene group having 1 to 6 carbon atoms, and the case wherein an amino group is bonded through sulfur atom and/or an oxygen atom and an alkyelen group having 1 to 6 carbon atoms.

The method of introducing an amino group into the low molecular weight diene polymer is not particularly limited, and may be a method which is usually employed. For example, a compound containing an amino group may be bonded with the low molecular weight diene polymer, or an amino group may be introduced by reacting ammonia or the like.

In concrete, for example, a solution obtained by dissolving the low molecular weight diene polymer into an organic solvent such as xylene or toluene is mixed with a primary amine such as cysteamine or aminothiophenol, a secondary amine such as ethyl thiourea or a tertiary amine such as diethyl thiourea alone or optionally an admixture of two or more. The mixture is agitated at 60° to 160° C. for 30 to 120 minutes in an atmosphere of inert gas such as nitrogen or argon to conduct an addition-reaction of the low molecular weight diene polymer with the amine. Then, after cooling to room temperature by natural cooling or the like, the solution obtained by the reaction is poured into water, neutralized with an acid such as hydrochloric acid or sodium hydrogencarbonate, and then washed again with water. Further, the organic solvent is removed by heating and drying under vacuum to obtain a desired compound.

According to another method of introducing an amino group into the low molecular weight diene polymer, thionyl chloride is added to a solution obtained by dissolving the low molecular weight diene polymer having hydroxyl group into an organic solvent such as xylene or toluene, and the obtained mixture is refluxed at 80° to 140° C. for 30 to 120 minutes. Then, after cooling to room temperature by natural cooling or the like, the mixture is poured into water and washed with water several times. Then, ammonium gas generated from aqueous ammonia is passed through the organic phase obtained by separation from the washed mixture by means of a separating funnel to react the low molecular weight diene polymer with ammonium. After the reaction the mixture is poured into water and washed with the above-mentioned acid and water in that order. Subsequently, the organic solvent is removed by heating and drying under vacuum to obtain a desired compound.

The carbon black used in the present invention may be a carbon black which has a functional group such as a hydroxyl group, a carboxyl group, a carbonyl group and/or a quinone group. The functional group is chemically bonded with an amino group of the amino-containing low molecular weight diene polymer of the surface-treating agent. As the carbon black, there may be employed furnace black, channel black, acetylene black, thermal black or lamp black alone or optionally in an admixture of two or more.

According to the present invention, carbon black having a relatively high specific surface area can be employed. BET specific surface area of the carbon black may be 20 to 200 $m^2/g$, and preferably 100 to 200 $m^2/g$ from the viewpoint that dispersibility of the surface-treated carbon black in the matrix polymer is good. Advantageously, a specific surface area of 130 to 200 $m^2/g$ from the viewpoint that mechanical properties of the rubber molded article which contains the surface-treated carbon black are improved. Examples of carbon black having a BET specific surface area of 20 to 200 $m^2/g$ are, for instance, GPF, FEF, HAF, ISAF, SAF, examples of 100 to 200 $m^2/g$ are, for instance, ISAF, SAF, and examples of 130 to 200 $m^2/g$ are, for instance, SAF, and the like.

The iodine adsorption number of the carbon black may be 30 to 160 mg/g, and preferably 80 to 160 mg/g from the viewpoint that the effect of the surface-treating agent is high, and preferably is an iodine adsorption number of 110 to 160 mg/g is used from the viewpoint of improvement of the mechanical properties of the rubber composition which contains the surface-treated carbon black. Examples of the carbon black having an iodine adsorption number of 30 to 160 mg/g are, for instance, FEF, HAF, ISAF, SAF, examples of 80 to 160 mg/g are, for instance, ISAF, SAF, and examples of 110 to 160 mg/g are, for instance, SAF, and the like.

As a method of surface-treating the carbon black with the surface-treating agent of the present invention, for example, the carbon black is added to a solution obtained by dissolving the surface-treating agent in xylene or toluene. The solution is subjected to agitation and mixing, and the resulting precipitate is dried by removing the organic solvent under vacuum to obtain the surface-treated carbon black. Also, in order to obtain a rubber without previous surface-treatment of the carbon black, composition, the carbon black and the surface-treating agent are blended separately with the rubber component and then the surface-treatment of the carbon black is carried out during kneading.

The rubber composition of the present invention contains the rubber component containing the diene rubber. The particular kind of diene rubber is not particularly limited, and the effects of the present invention can be obtained with all kinds of the diene rubber. As the diene rubber, the diene rubber used generally for a rubber composition for tire such as the above-mentioned NR, BR, IR, SBR, NBR can be used alone or in admixture of two or more.

In addition, usual additives for rubbers, for example, vulcanizing agents such as sulfur, an accelerator, an antioxidant, a softening agent, a zinc oxide and/or stearic acid may be added to the rubber composition of the present invention in an amount where the effects of the present invention are not decreased.

The rubber composition of the present invention may be prepared and vulcanized by usual manner.

When the rubber composition of the present invention is used as a rubber composition for tire tread or sidewall, a tire superior in both of low fuel consumption and abrasion resistance can be provided.

Hereinafter, the present invention is explained on the basis of Examples. It should be noted that the present invention is not limited thereto.

PREPARATION EXAMPLE 1

Preparation of the Surface-treating Agent 100 g of LIR-30 (liquid polyisoprene, molecular weight: 29,000) available from KURARAY CO., LTD. as the low molecular wegith diene polymer was dissolved in xylene to obtain a 10% by weight solution. 11 g of cysteamine was admixed with the solution and addition reaction was conducted by agitating the obtained mixture in an atmosphere of nitrogen at 130° C. for 2 hours. After cooling to room temperature by natural cooling, the mixture was poured into water, neutralized with formic acid and washed with water again. The organic phase and the water phase were separated by means of a separating funnel and the organic solvent was removed to obtain Surface-Treating Agent 1 of the present invention.

The content of amino group of Surface-Treating Agent 1 is 2% by mole per the diene unit. As the method of determining the content of amino group, there was employed a method in which the content was calculated from an intensity ratio of H of $NH_2$ and H of $CH_3$ of polyisoprene in $^1$H-NMR.

The infrared ray analysis and the differential thermal analysis were conducted with respect to the obtained surface-treating agent. According to the infrared spectra, an absorption of amino group was observed at 1600 cm$^{-1}$. In the differential thermal analysis, though a peak of the melting point could be observed at around 98° C. in case of cysteamine alone, the peak at around 98° C. disappeared with respect to the surface-treating agent of the present invention. Therefore, it was recognized that an amino group was introduced to the low molecular weight diene polymer.

PREPARATION EXAMPLE 2

Preparation of the Surface-treating Agent

Surface-Treating Agent 2 of the present invention was prepared in the same manner as in Preparation Example 1 except that the amount of cysteamine was 87.8 g.

The content of amino group of Surface-Treating Agent 2 was 15% by mole per the diene unit. The measurement of the amino content was conducted in the same manner as in Preparation Example 1.

The measurement of infrared ray analysis and the differential thermal analysis of the obtained surface-treating agent were conducted. According to the infrared spectra, an absorption of amino group was observed at 1600 cm$^{-1}$, and it was recognized that an amino group was introduced to the low molecular weight diene polymer.

PREPARATION EXAMPLE 3

Preparation of the Surface-treating Agent 100 g of LIR-506 (liquid hydroxylated polyisoprene, molecular weight: 25,000, number of functional group: 5.9 OH/molecule) available from KURARAY CO., LTD. was dissolved in xylene to obtain a 10% by weight solution. 2.8 g thionyl chloride was admixed with the solution and the obtained mixture was refluxed at 130° C. for 2 hours. Then, after cooling to room temperature by natural cooling, the mixture was poured into water and washed with water twice. The organic phase was collected, and ammonia generated from aqueous ammonia (28%) was introduced into the organic phase to react at 130° C. for 2 hours. Then, the mixture was poured into water, neutraized with sodium hydrogencarbonate and washed with water. The water phase and the organic phase were separated by means of a separating funnel. The organic solvent was removed from the separated organic phase by drying under vacuum to obtain Surface-Treating Agent 3 of the present invention.

The content of amino group of Surface-Treating Agent 3 was about 6% by mole per the diene unit. The measurement of the amino content was conducted in the same manner as in Preparation Example 1.

The measurement of infrared ray analysis and the differential thermal analysis of the obtained surface-treating agent were conducted. According to the infrared spectra, an absorption of amino group was observed at 1600 cm$^{-1}$, and it was recognized that an amino group was introduced to the low molecular weight diene polymer.

PREPARATION EXAMPLE 4

Preparation of the Surface-treating Agent

Surface-Treating Agent 4 was prepared in the same manner as in Preparation Example 1 except that LIR-50 (liquid polyisoprene, molecular weight: 47,000) available from KURARAY CO., LTD. was used as the low molecular weight diene polymer.

The content of amino group of Surface-Treating Agent 4 was 2% by mole per the diene unit. The measurment of the amino content was conducted in the same manner as in Preparation Example 1.

The measurement of infrared ray analysis and the differential thermal analysis of the obtained surface-treating agent were conducted. According to the infrared spectra, an absorption of amino group was observed at 1600 cm$^{-1}$, and it was recognized that an amino group was introduced to the low molecular weight diene polymer.

PREPARATION EXAMPLE 5

Preparation of the Surface-treating Agent

Surface-Treating Agent 5 was prepared in the same manner as in Preparation Example 2 except that LBR: Poly-bd R45M (liquid polybutadiene, molecular weight: 3,000) available from Idemitsu Sekiyu Kagaku Kabushiki Kaisha was used as the low molecular weight diene polymer.

The content of amino group of the surface-treating agent 5 was 2% by mole per the diene unit. The measurement of the amino content was conducted in the same manner as in Preparation Example 1.

The measurement of infrared ray analysis and the differential thermal analysis of the obtained surface-treating agent were conducted. According to the infrared spectra, an absorption of amino group was observed at 1600 cm$^{-1}$, and it was recognized that an amino group was introduced to the low molecular weight diene polymer.

The low molecular weight diene polymers and the amines used for the preparation of Surface-Treating Agents 1 to 5 and the contents of amino group of Surface-Treating Agents 1 to 5 are shown in Table 1.

TABLE 1

|  | Preparation Example (Surface-treating agent) | | | | |
| --- | --- | --- | --- | --- | --- |
|  | 1 | 2 | 3 | 4 | 5 |
| Low molecular weight diene polymer | LIR-30 | LIR-30 | LIR-506 | LIR-50 | LBR |
| Amine | Cysteamine | Cysteamine | Cysteamine | Cysteamine | Cysteamine |
| Content of amino group (% by mole) | 2 | 15 | about 6 | 2 | 2 |

COMPARATIVE PREPARATION EXAMPLE 1

Preparation of the Comparative Surface-treating Agent

A living polymer was prepared by polymerizing isoprene monomer in n-hexane in the presence of n-butyllithium as an initiator. Carbon dioxide gas was introduced to the polymer in an amount of 10 times by mole of the polymerizable end to obtain Polyisoprene (I) containing COOLi at one end of the molecular chain.

Polyisoprene (I) containing COOLi at one end of the molecular chain was washed with hydrochloric acid to obtain Polyisoprene (II) containing COOH at one end.

Then, Polyisoprene (II) containing COOH at one end was dissolved in toluene and reacted with hydrazin in an amount of 100 times by mole of the end COOH to obtain polyisoprene (Comparative Surface-Treating Agent) containing $NH_2$ at one end of the molecular chain.

The conversion of COOH to $NH_2$ was recognized by the infrared ray analysis.

EXPERIMENTAL EXAMPLE 1

Preparation of the Surface-treated Carbon Black

Surface-Treated Carbon Blacks 1 to 5 were prepared by using Surface-Treating Agents 1 to 5 obtained in the Preparation Examples 1 to 5 and N110 (SAF class: BET specific surface area of 163 $m^2$/g, iodine adsorption number of 140 mg/g) available from Mitsubishi Chemical Corporation as the carbon black. After dissolving each of Surface-Treating Agents 1 to 5 in xylene, N110 was dipped into the solution and, then, allowed to stand at room temperature for a day, and dried under vacuum to obtain Surface-Treated Carbon Blacks 1 to 5.

(Preparation of the Rubber Composition)

Subsequently, 80 parts by weight of natural rubber and Surface-Treated Carbon Blacks 1 to 5 were mixed in the mixing ratio shown in Table 2 and kneaded together with other additives except for sulfur at 100° C. for 4 minutes by means of a BR type banbury mixer to obtain Rubber Compositions 1 to 5 of the present invention. The obtained Rubber Compositions 1 to 5 were transferred to open rolls, and press vulcanization was carried out at 150° C. for 30 minutes to obtain Vulcanized Rubber Compositions 1 to 5.

At the time of the kneading, as the other additives, 2 parts by weight of stearic acid, 3 parts by weight of zinc oxide, 1.5 parts by weight of sulfur and 1 part by weight of NOC-CELER NS ((N-t-butyl-2)-benzothiazolylsufeneamide) available from Ouchi Sinko Kagaku Kogyo Kabushiki Kaisha as accelarator were blended in all of Rubber Compositions.

Then, the following tests were carried out to evaluate processability, mechanical properties and low fuel consumption with respect to Vulcanized Rubber Compositions 1 to 5 which were obtained by vulcanizing Rubber Compositions 1 to 5 of the present invention.

Testing Methods (i) Mooney Test:

Mooney viscosity (ML(1+4)) and scorch time (minute) were measured at 130° C. The results are shown in Table 2. The smaller the Mooney viscosity is, the better the processability is, and the shorter the scorch time is, the more difficult the handling of the non-vulcanized rubber is.

(ii) Tensile Test:

Tensile stress (M300) (Pa) at the time of 300% elongation, tensile strength (Tb) and elongation at break (Eb) (%) were measured according to JIS K 6301. The results are shown in Table 2.

(iii) Hardness Test:

Hardness was measured according to JIS K6301. The results are shown in Table 2.

(iv) Viscoelasticity Test:

Viscoelasticity (E*) (MPa) and loss tangent (tan δ) were measured by using Visco Elasticity Spectrometer VES available from Kabushiki Kaisha Iwamoto Seisakusho under measuring conditions of a temperature of 70° C., initial stress of 10% and dynamic stress of 2%.

The results are shown in Table 2. The smaller the loss tangent is, the lower the fuel consumption is.

(v) Abrasion Test:

Abrasion loss was measured by using Lambourn abrasion tester under measuring conditions of a temperature of 23° C., slip ratio of 20% and testing time of 5 minutes. The results were represented as index on the assumption that the abrasion loss of Comparative Rubber Composition 1 described below was 100. The results are shown in Table 2 for abrasion property. The larger the index is, the superiorer the abrasion resistance is.

(vi) Degree of Swelling with Toluene:

Volume change before and after swelling was measured by dipping the vulcanized rubber compositions into toluene of 40° C. for 48 hours, and the degree of swelling with toluene was calculated according to the following equation:

Degree of swelling with toluene (%)=(Volume after swelling/Volume before swelling)×100

The results are shown in Table 2. The lower the degree of swelling with toluene is, the higher the crosslinking density is.

(Preparation of the Comparative Rubber Composition)

80 parts by weight of natural rubber and the same additives as used for the above-mentioned Rubber Compositions of the present invention were mixed in the mixing ratio shown in Table 2. The mixture without sulfur was kneaded at 100° C. for 4 minutes by means of a BR type banbury mixer to obtain Comparative Rubber Composition. After transferring into open rolls, Comparative Rubber Composition was vulcanized with addition of sulfur at 150° C. for 30 minutes to obtain Vulcanized Comparative Rubber Comporisions 1 to 5.

Then, with respect to Vulcanized Comparative Rubber Compositions 1 to 5, the same evaluations were conducted as for the above-mentioned rubber compositions. The results are shown in Table 2.

TABLE 2

|  | Rubber Composition | | | | | Comparative Rubber Composition | | | | |
| --- | --- | --- | --- | --- | --- | --- | --- | --- | --- | --- |
|  | 1 | 2 | 3 | 4 | 5 | 1 | 2 | 3 | 4 | 5 |
| Surface-treated carbon black | | | | | | | | | | |
| Number | 1 | 2 | 3 | 4 | 5 | — | — | — | — | — |
| Low molecular weight diene polymer | LIR-30 | LIR-30 | LIR-506 | LIR-5O | LBR | — | — | — | — | — |
| parts by weight | 63 | 69 | 63 | 63 | 63 | — | — | — | — | — |
| Comparative surface-treating agent | — | — | — | — | — | — | — | — | — | 20 |
| Low molecular weight diene polymer (parts by weight) | | | | | | | | | | |
| LIR-30 | — | — | — | — | — | 20 | 20 | — | — | — |
| LIR-50 | — | — | — | — | — | — | — | 20 | — | — |
| LBR | — | — | — | — | — | — | — | — | 20 | — |
| Carbon black (N110) (parts by weight) | — | — | — | — | — | 40 | 40 | 40 | 40 | 40 |
| Cysteamine (parts by weight) | — | — | — | — | — | — | 3 | — | — | — |
| Mooney viscosity (ML (1 + 4)) | 50 | 69 | 41 | 47 | 34 | 35 | 65 | 39 | 27 | 40 |
| Scorch time (minute) | 23 | 12 | 21 | 24 | 23 | 29 | 9 | 30 | 28 | 25 |
| M300 (MPa) | 11.2 | 24.2 | 9.5 | 9.8 | 7.2 | 6.5 | 8.5 | 7.2 | 5.2 | 7.2 |
| Tb (MPa) | 27.6 | 37.1 | 27.2 | 24.3 | 16.3 | 25.5 | 26.6 | 25.1 | 15.3 | 26.0 |
| Eb (MPa) | 525 | 415 | 563 | 509 | 398 | 586 | 573 | 576 | 486 | 572 |
| Hardness | 63 | 69 | 64 | 62 | 57 | 55 | 58 | 57 | 51 | 57 |
| E* (MPa) | 6.9 | 11.8 | 6.2 | 5.3 | 4.3 | 3.8 | 4.5 | 4.2 | 3.0 | 4.0 |
| tan δ | 0.151 | 0.110 | 0.156 | 0.155 | 0.163 | 0.175 | 0.165 | 0.170 | 0.187 | 0.170 |
| Swelling degree with toluene (%) | 270 | 215 | 286 | 295 | 300 | 330 | 296 | 321 | 356 | 305 |
| Abrasion property | 135 | 152 | 121 | 116 | 105 | 100 | 110 | 105 | 91 | 105 |

EXPERIMENTAL EXAMPLE 2

Preparation of the Surface-treated Carbon Black and the Rubber Composition

By using the surface-treating agent 1 obtained in Preparation Example 1 and, as the carbon black, N110 (SAF class: BET specific surface area of 163 m$^2$/g, iodine adsorption number of 140 mg/g), N220 (ISAF class: BET specific surface area of 121 m$^2$/g, iodine adsorption number of 119 mg/g), N330 (HAF class: BET specific surface area of 82 m$^2$/g, iodine adsorption number of 83 mg/g) and N550 (FEF class: BET specific surface area of 43 m$^2$/g, iodine adsorption number of 42 mg/g) available from Mitsubishi Chemical Corporation, Surface-Treated Carbon Blacks 1 and 6 to 8 were obtained in the same manner as in Experimental Example 1 and, further, Rubber Compositions 1 and 6 to 8 and Vulcanized Rubber Compositions 1 and 6 to 8 were obtained in the same manner as in Experimental Example 1.

Then, the same evaluations were conducted as in Experimental Example 1. The results are shown in Table 3.

(Preparation of the comparative rubber composition)

According to the mixture and the mixing ratio shown in Table 3, Vulcanized Comparative Rubber Compositions 2 and 6 to 8 were obtained in the same manner as in Experimental Example 1. Then, the same evaluations were conducted as in Experimental Example 1. The results are shown in Table 3.

TABLE 3

|  | Rubber Composition | | | | Comparative Rubber Composition | | | |
| --- | --- | --- | --- | --- | --- | --- | --- | --- |
|  | 1 | 6 | 7 | 8 | 2 | 6 | 7 | 8 |
| Surface-treated carbon black | | | | | | | | |
| Number | 1 | 6 | 7 | 8 | — | — | — | — |
| Diene polymer | N110 | N220 | N330 | N550 | — | — | — | — |
| parts by weight | 63 | 63 | 63 | 63 | — | — | — | — |
| Low molecular weight diene polymer (LIR-30) (parts by weight) | — | — | — | — | 20 | 20 | 20 | 20 |
| Carbon black (N110) (parts by weight) | | | | | | | | |
| N110 | — | — | — | — | 40 | — | — | — |
| N220 | — | — | — | — | — | 40 | — | — |
| N330 | — | — | — | — | — | — | 40 | — |
| N550 | — | — | — | — | — | — | — | 40 |
| Cysteamine (parts by weight) | — | — | — | — | 3 | — | — | — |
| Mooney viscosity (ML (1 + 4)) | 50 | 37 | 29 | 29 | 65 | 32 | 25 | 25 |
| Scorch time (minute) | 23 | 27 | 27 | 26 | 9 | 30 | 31 | 31 |
| M300 (MPa) | 11.2 | 6.4 | 5.9 | 5.7 | 8.5 | 6.0 | 5.6 | 5.5 |
| Tb (MPa) | 27.6 | 24.9 | 23.3 | 22.8 | 26.6 | 24.1 | 22.7 | 21.9 |
| Eb (MPa) | 525 | 563 | 551 | 560 | 573 | 598 | 595 | 578 |
| Hardness | 63 | 56 | 53 | 52 | 58 | 53 | 50 | 49 |
| E* (MPa) | 6.9 | 3.9 | 3.3 | 2.7 | 4.5 | 3.2 | 2.8 | 2.1 |

TABLE 3-continued

|  | Rubber Composition | | | | Comparative Rubber Composition | | | |
| --- | --- | --- | --- | --- | --- | --- | --- | --- |
|  | 1 | 6 | 7 | 8 | 2 | 6 | 7 | 8 |
| tan δ | 0.151 | 0.155 | 0.148 | 0.121 | 0.165 | 0.170 | 0.159 | 0.142 |
| Swelling degree with toluene (%) | 270 | 299 | 301 | 312 | 296 | 347 | 352 | 372 |
| Abrasion property | 135 | 105 | 95 | 86 | 110 | 95 | 85 | 72 |

As is seen from Tables 2 and 3, each of the vulcanized rubber compositions which are prepared by using the rubber compositions comprising the carbon black surface-treated with the surface-treating agent for carbon black of the present invention, has superior proccessability, mechanical properties and low fuel consumption compared to the comparative vulcanized rubber compositions.

When the other components or additives described in the specification of the present invention are used instead of the components and additives used in Examples, substantially the same results can be obtained.

When the carbon black surface-treated with the surface-treating agent of the present invention is blended with the matrix polymer such as diene rubber, the rubber composition which is superior in processability, mechanical properties and low fuel consumption and is useful, for example, for tire can be provided.

What is claimed is:

1. A surface-treating agent for carbon black comprising an amino-containing low molecular weight diene polymer which comprises a trunk chain of a low molecular weight diene polymer having a molecular weight of 1,000 to 100,000 and having side chains containing amino groups in an amount of 0.25 to 20 mole % per diene unit of the trunk chain, with no amino groups being disposed at the ends of the trunk chain.

2. The carbon black bonded with the amino-containing low molecular weight diene polymer of claim 1, wherein said bonding is made through hydrogen bonding.

3. A rubber composition comprising a blend of the surface-treating agent of claim 1, a rubber component containing a diene rubber and a carbon black.

4. Carbon black bonded with a surface-treating agent, said surface-treating agent comprising an amino-containing low molecular weight diene polymer which comprises a trunk chain of a low molecular weight diene polymer having a molecular weight of 1,000 to 100,000 and having side chains containing amino groups in an amount of 0.25 to 20 mole % per diene unit of the trunk chain, with no amino groups being disposed at the ends of the trunk chain.

5. A rubber composition comprising the carbon black bonded with the surface-treating agent of claim 4 blended with a diene rubber component.

6. The rubber composition of claim 5, wherein the carbon is bonded with the amino-containing low molecular weight diene polymer through hydrogen bonding.

7. A vehicle tire having a composition comprising a rubber component and carbon black bonded with a surface-treating agent, said surface-treating agent comprising an amino-containing low molecular weight diene polymer which comprises a trunk chain of a low molecular weight diene polymer having a molecular weight of 1,000 to 100,000 and having side chains containing amino groups in an amount of 0.25 to 20 mole % per diene unit of the trunk chain, with no amino groups being disposed at the ends of the trunk chain.

8. The vehicle tire of claim 7, wherein the rubber component contains a diene rubber.

\* \* \* \* \*